(12) United States Patent
Shim et al.

(10) Patent No.: US 8,373,815 B2
(45) Date of Patent: Feb. 12, 2013

(54) OPTICAL SHEET AND LIQUID CRYSTAL DISPLAY EQUIPPED WITH THE SAME

(75) Inventors: Yong-Shig Shim, Seoul (KR); Young-Il Kim, Gyeonggi-do (KR); Jeong-Ho Park, Seoul (KR)

(73) Assignee: LMS Co., Ltd, Gyeonggi-do (KR)

( * ) Notice: Subject to any disclaimer, the term of this patent is extended or adjusted under 35 U.S.C. 154(b) by 228 days.

(21) Appl. No.: 12/919,949

(22) PCT Filed: Feb. 27, 2009

(86) PCT No.: PCT/KR2009/000945
§ 371 (c)(1),
(2), (4) Date: Aug. 27, 2010

(87) PCT Pub. No.: WO2009/108003
PCT Pub. Date: Sep. 3, 2009

(65) Prior Publication Data
US 2011/0013118 A1    Jan. 20, 2011

(30) Foreign Application Priority Data
Feb. 29, 2008 (KR) .................. 10-2008-0019350

(51) Int. Cl.
*G02F 1/1335* (2006.01)
(52) U.S. Cl. ............... 349/57; 349/62; 349/95
(58) Field of Classification Search ........... 349/57, 349/62, 95
See application file for complete search history.

(56) References Cited

U.S. PATENT DOCUMENTS

| | | | |
|---|---|---|---|
| 5,280,371 A | 1/1994 | McCartney, Jr. et al. | |
| 5,771,328 A | 6/1998 | Wortman | |
| 5,779,337 A | 7/1998 | Saito et al. | |
| 7,448,776 B2 | 11/2008 | Tang | |
| 7,545,569 B2 * | 6/2009 | Cassarly | 359/628 |
| 2004/0105157 A1 | 6/2004 | Matsushita et al. | |
| 2005/0024849 A1 | 2/2005 | Parker et al. | |
| 2005/0141243 A1 | 6/2005 | Mullen et al. | |

FOREIGN PATENT DOCUMENTS

| | | |
|---|---|---|
| KR | 20-0364045 | 9/2004 |
| KR | 10-2008-0019541 A | 3/2008 |
| KR | 10-2008-0084559 A | 9/2008 |
| WO | WO 2006-133458 A2 | 12/2006 |

* cited by examiner

*Primary Examiner* — James Dudek
(74) *Attorney, Agent, or Firm* — Reinhart Boerner Van Deuren P.C.

(57) ABSTRACT

An optical sheet and a Liquid Crystal Display (LCD) incorporating the same. The LCD includes a sheet-like transparent substrate made of a transparent material and a microscopic structure layer formed on one surface of the transparent substrate. The microscopic structure layer has an array of microscopic structures to emit light. A liquid crystal panel is formed above the microscopic structure layer, and has defined therein a plurality of pixels to display an image. When seen from above the transparent substrate, at least a portion of the microscopic structures has parallel and non-parallel arrangements repeated one or more times in a longitudinal direction thereof with respect to one side-edge of the pixels of the liquid crystal panel.

17 Claims, 5 Drawing Sheets

OPTICAL SHEET AND LIQUID CRYSTAL DISPLAY EQUIPPED WITH THE SAME

CROSS-REFERENCE TO RELATED APPLICATIONS

This patent application is the National Stage of International Application No. PCT/KR2009/000945, filed Feb. 27, 2009, that claims the benefit of Korean Application No. 10-2008-0019350, filed Feb. 29, 2008, the entire teachings and disclosure of which are incorporated herein by reference thereto.

TECHNICAL FIELD

The present invention relates to an optical sheet having a microscopic structure, in which at least a portion thereof in the lengthwise direction includes parallel and non-parallel arrangements, and a Liquid Crystal Display (LCD) incorporating the same. More particularly, the present invention relates to an optical sheet that can effectively remove moiré fringes and improve luminance, and an LCD incorporating the same.

BACKGROUND ART

Liquid Crystal Displays (LCDs) are widely used as information displays for notebook computers, personal computers, TVs, or the like. Their characteristics are being improved every year due to the expansion of demand. A liquid crystal panel of an LCD needs a backlight unit due to its structure that does not emit light. The backlight unit includes a variety of optical elements. In addition, the backlight unit uses optical sheets that are arranged periodically to improve luminance.

FIG. 1 shows the structure of a typical LCD. As shown in FIG. 1, the LCD 101 includes a backlight unit 20 and a liquid crystal panel 30. The backlight unit 20 includes a light source 21, a light guide plate 22, a diffuser sheet 24, and prism sheets 10. Light generated from the light source 21 is incident directly on the eye after it has been scattered through the light guide plate 22, so the light reflects the pattern of the light guide plate 22 as it is. This pattern can be appreciated clearly even after the liquid crystal panel 30 is mounted, the diffuser sheet 24 is used to remove or minimize the pattern. However, the luminance of the light is lowered sharply due to scattering in both the horizontal and vertical directions when it has passed through the diffuser sheet 24. In response, the prism sheets 10 condense the light again in order to raise the luminance. The prism sheets 10 have microscopic pitches in the form of waves. In general, a set of prism sheets including two prism sheets, the pitches of which are aligned orthogonally, are used. After the light has passed through the prism sheets, it is directed forward with a focused viewing angle, and also the luminance is improved. In the LCD to which this structure is applied, the periodic structure of the liquid crystal panel 30 and the periodic structure of the prism sheets 10 are combined with each other, thereby creating moiré fringes having a different period.

As shown in FIG. 2, the moiré fringes, which are observed when two periodic grids Gd and Gr having a pitch P are met at an angle θ, have a period D, which is determined as in Formula 1:

$$D = P/2 \sin(\theta/2) \quad \text{Formula 1}$$

As seen from Formula 1, when the included angle θ defined by two periodic grids is smaller, the period of the moiré fringes creates a greater grid. The moiré fringes produce periodic light and dark patterns on the liquid crystal panel 30, thereby causing a factor attributable to degradation in the quality of the LCD 101.

In order to remove the moiré fringes in LCDs, a variety of approaches is underway. As a representative example, U.S. Pat. No. 5,280,371 discloses a technique to remove the moiré fringes. As shown in FIG. 3, in the LCD, the prism sheet 10 is tilted at a small angle with respect to the liquid crystal panel 30 (i.e., is rotated with respect to the vertical axis of the liquid crystal panel 30). This can sufficiently increase the period of the moiré fringes so that the moiré fringes do not appear on the display panel. In this LCD, the moiré fringes are reduced since the prism sheet having a periodic arrangement was rotated to tilt the arrangement. However, there is a drawback in that the luminance is lowered since the arrangement of the prism sheet is tilted.

DISCLOSURE

Technical Problem

Various aspects of the present invention provide an optical sheet that can effectively remove moiré fringes and improve luminance.

Also provided is a Liquid Crystal Display (LCD) that can minimize moiré fringes and prevent luminance from decreasing as much as possible by properly matching the arrangement of a liquid crystal panel and the arrangement of an optical sheet.

Technical Solution

In an aspect of the present invention, the optical sheet includes a sheet-like transparent substrate made of a transparent material; and a microscopic structure layer formed on one surface of the transparent substrate. The microscopic structure layer has an array of microscopic structures to emit light. When seen from above the transparent substrate, at least a portion of the microscopic structures has parallel and non-parallel arrangements repeated in a longitudinal direction thereof.

In another aspect of the invention, the liquid crystal display includes a sheet-like transparent substrate made of a transparent material; a microscopic structure layer formed on one surface of the transparent substrate, the microscopic structure layer having an array of microscopic structures to emit light; and a liquid crystal panel formed above the microscopic structure layer. The liquid crystal panel has defined therein a plurality of pixels to display an image. When seen from above the transparent substrate, at least a portion of the microscopic structures has parallel and non-parallel arrangements repeated one or more times in a longitudinal direction thereof with respect to one side-edge of the pixels of the liquid crystal panel.

Advantageous Effects

As set forth above, it is possible to minimize the moiré fringes since the tilting angle between the transparent panel and the optical sheet is defined freely within the tilting angle of the non-parallel microscopic structures, thereby minimizing display quality deterioration due to the moiré fringes such that the display quality deterioration is observed by a user.

In addition, it is possible to blank the sheet freely within the tilting angle of the non-parallel microscopic structures departing from the 45/135 degree blanking method of the related art, i.e., the method of manufacturing LCDs as shown in FIG. 3. Therefore, it is possible to improve yield and productivity by reducing losses attributable to the blanking.

In addition, the backlight unit on which the optical sheet is mounted can improve display quality by minimizing white spots and white lines in the form of oblique lines, which would occur in a backlight unit using point light sources such as LEDs due to the tilting of the optical sheet at 45 or 135 degrees, and dead spaces of the backlight unit, which were required to maintain the outer appearance.

In addition, the LCD on which the backlight unit is mounted can minimize degradation in luminance attributable to the tilting of the optical sheet while preventing the moiré fringes, since a portion of the arrangements of optical sheet matched with the liquid crystal panel is parallel and another portion of the arrangements of optical sheet is not parallel, thereby improving the display quality and light efficiency.

Furthermore, the LCD can achieve the effects in that the moiré fringes are reduced and defects on the optical sheet are covered, since the above-described pattern is applied. Thereby, it is possible to improve the scratch resistance characteristics of the optical sheet and the outer appearance of the backlight unit.

MAJOR REFERENCE NUMERALS AND SYMBOLS OF DRAWINGS

Figure 1:
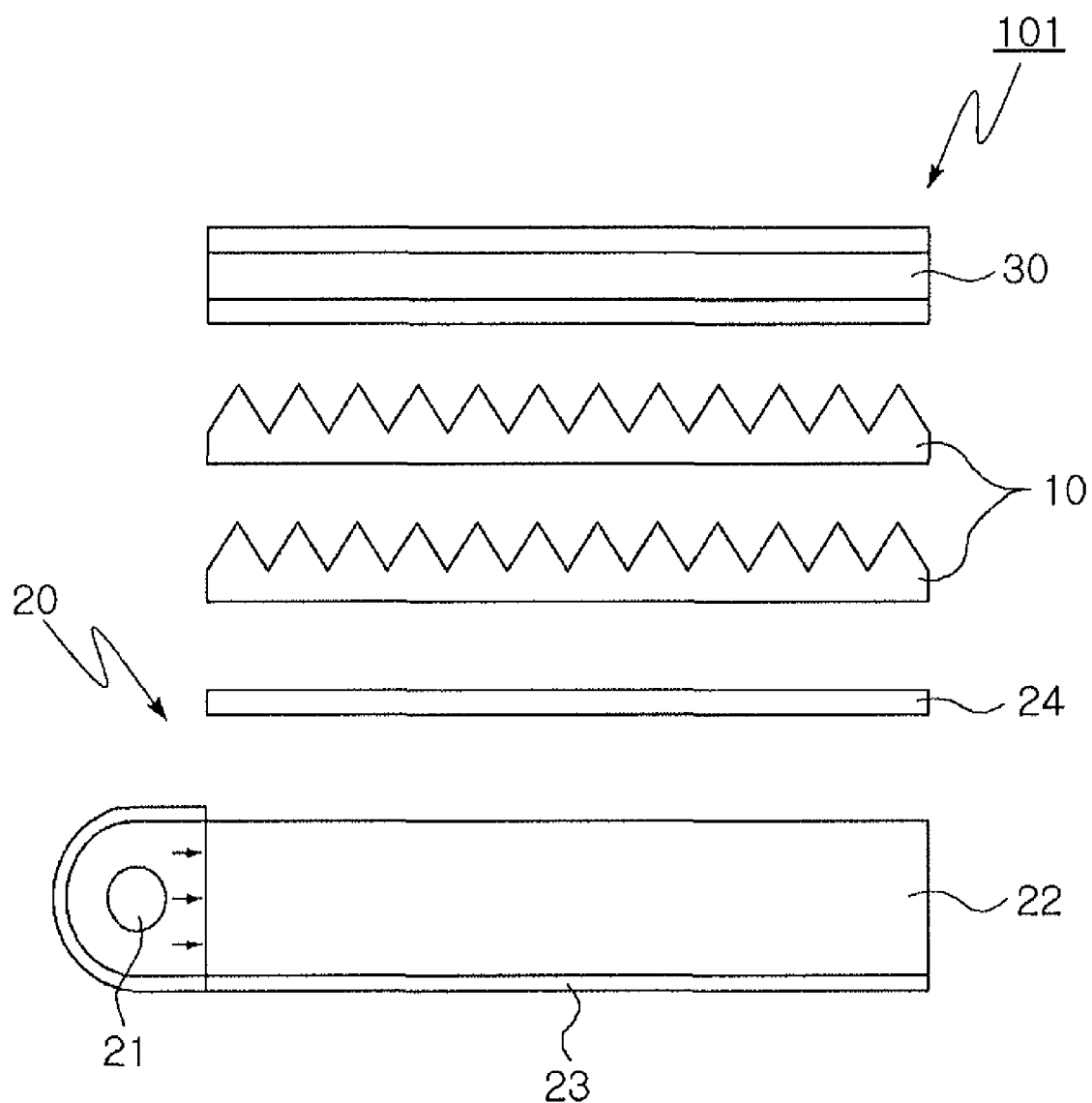
FIG. 1 is an exploded perspective view showing a typical LCD.
Figure 2:
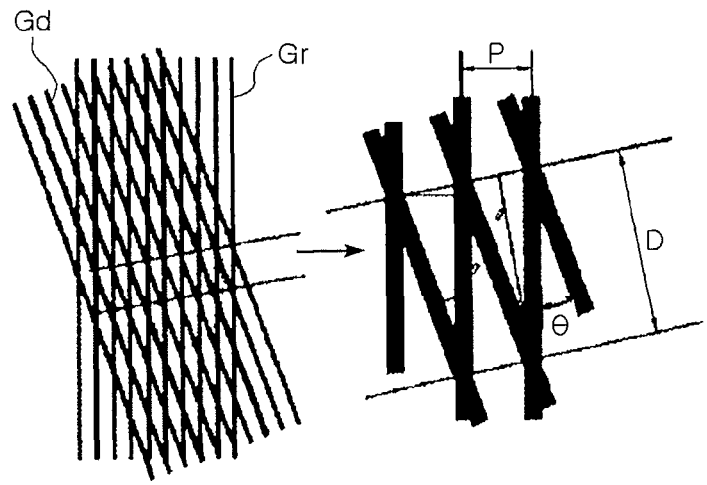
FIG. 2 is a schematic view showing two grids in order to explain moiré fringes that occur in the LCD.

100: LCD
110: optical sheet
111: transparent substrate
112: microscopic structure layer
113, 115: microscopic structure
120: backlight unit
121: light source
122: light guide plate
123: reflector sheet
124: diffuser sheet

[Best Mode]

Reference will now be made in detail to various embodiments of the present invention(s), examples of which are illustrated in the accompanying drawings and described below.

Figure 4:
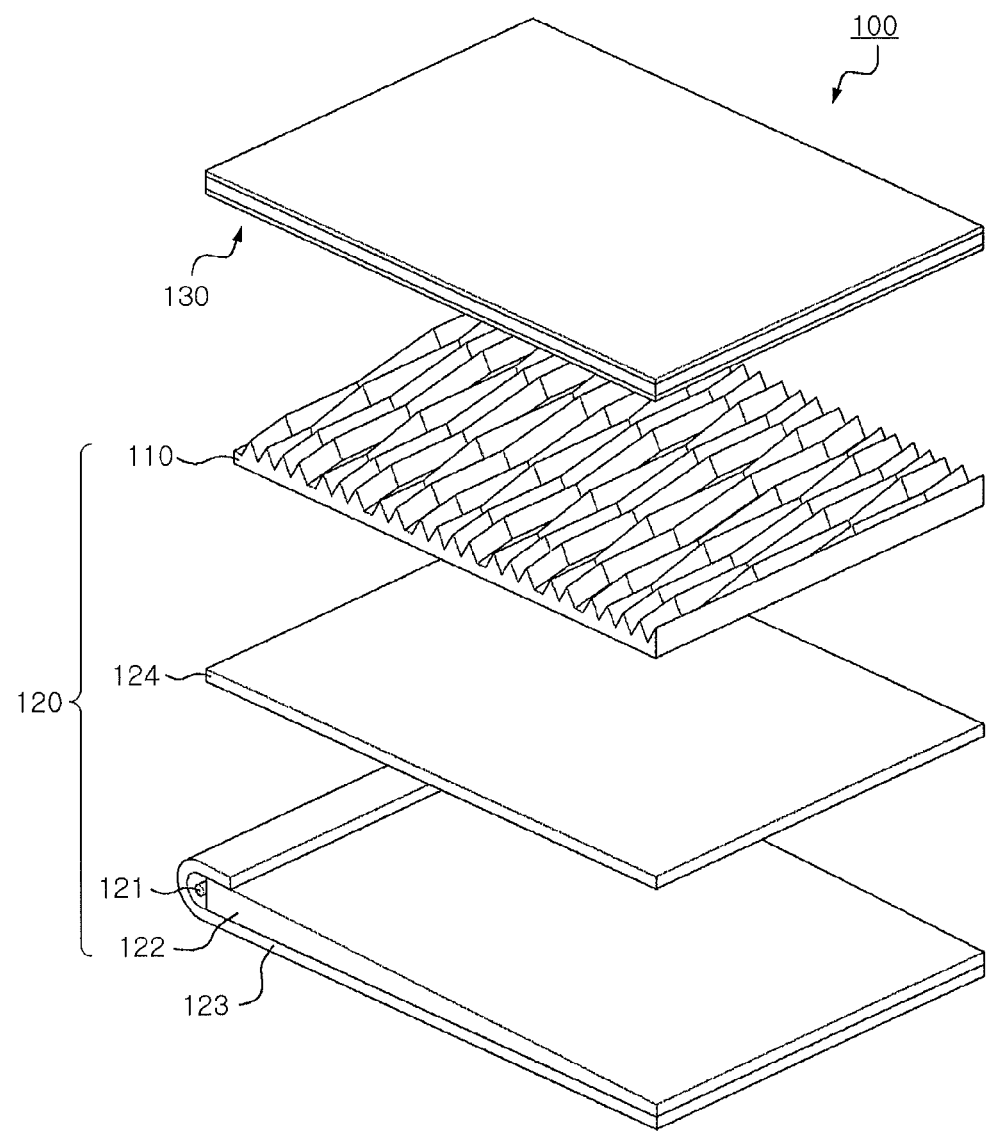
FIG. 4 is an exploded perspective view showing an LCD according to an exemplary embodiment of the invention.

FIG. 4 is an exploded perspective view showing an LCD according to an exemplary embodiment of the invention. Referring to FIG. 4, the LCD 100 of this embodiment includes a liquid crystal panel 130 and a backlight unit 120.

Figure 7:
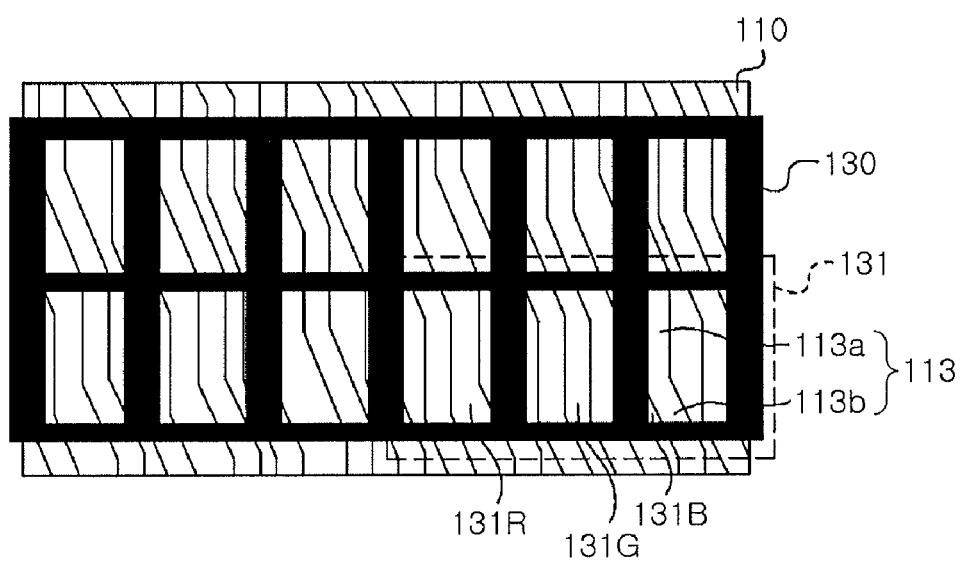
FIG. 7 is a view showing the relationship between the liquid crystal panel and the optical sheet in the LCD shown in FIG. 4.

As is well known in the art, the liquid crystal panel 130 reproduces a color image (composed of R, G, and B colors) by controlling light that is emitted from the backlight unit 120 to pass through respective pixels 131 (see FIG. 7).

The backlight unit 120 includes a light source 121, a light guide plate 122 disposed adjacent to the light source 121, and an optical sheet 110. A diffuser sheet 124 can also be disposed between the light guide plate 122 and the optical sheet 110. In addition, a reflector sheet 123 is provided on the rear surface of the light guide plate 122, and a protective sheet (not shown) can be disposed above the optical sheet 110 in order to protect the optical sheet 110. A detailed description of the LCD 100 of this embodiment will be omitted herein, since the structure of the LCD 100 is substantially the same as the known structure shown in FIG. 1, except for the optical sheet 110, which will be described hereinafter.

Figure 5:
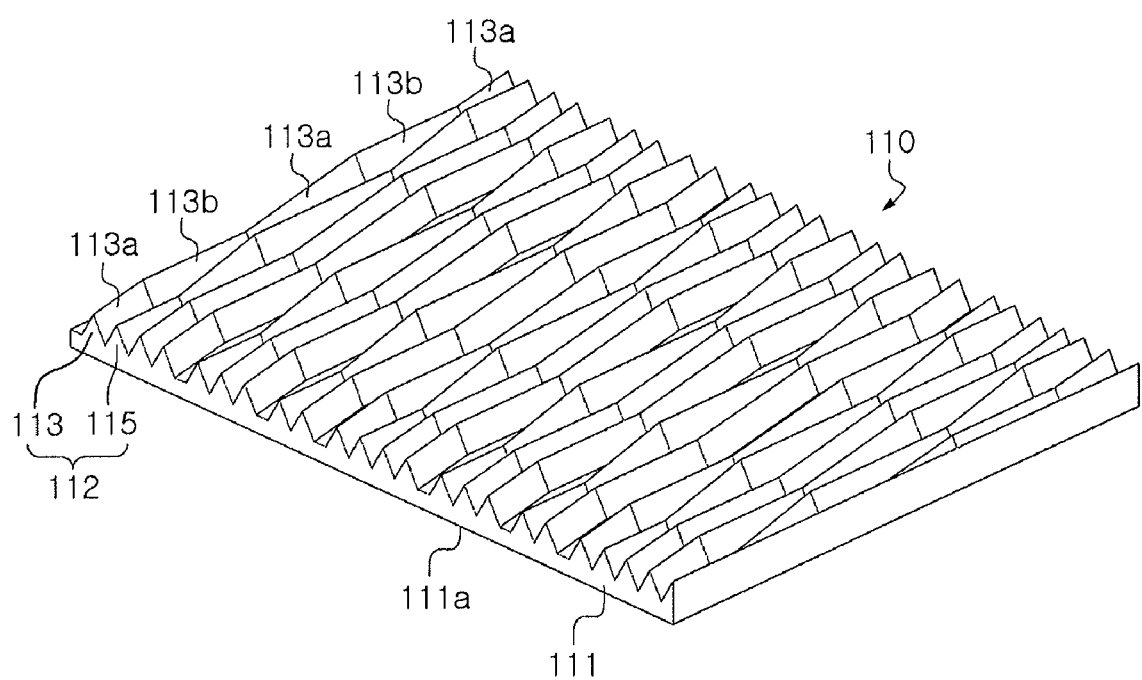
FIG. 5 is a perspective view of the optical sheet shown in FIG. 4.
Figure 6:
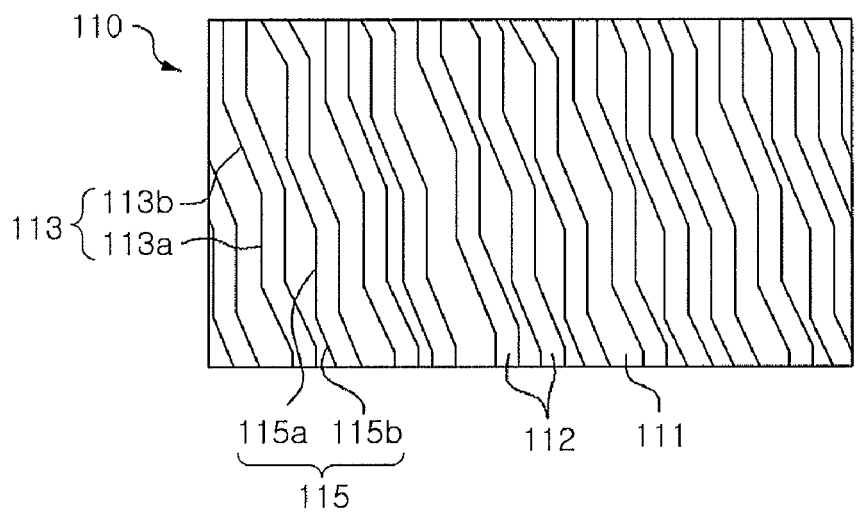
FIG. 6 is a top plan view of the optical sheet shown in FIG. 4.

FIGS. 5 and 6 show an exemplary embodiment of the optical sheet according to the invention. Here, FIG. 5 is a perspective view of the optical sheet, and FIG. 6 is a top plan view of the optical sheet. Referring to FIGS. 5 and 6, the optical sheet 110 according to this embodiment of the invention, i.e. a prism sheet, includes a transparent substrate 111 and a microscopic structure layer 112.

The transparent substrate 111 is made of a transparent material that allows light to pass through, and forms a body of the optical sheet. The transparent material of the transparent substrate can be a transparent resin that is one selected from among acrylate, Polycarbonate (PC), polyester, and Polyvinyl Chloride (PVC).

The microscopic structure layer 112 formed on the surface of the transparent substrate 111 includes a number of microscopic structures 113 and 115 to emit light. The surface 111a of the transparent substrate 111 opposite the surface on which the microscopic structure layer 112 is located can form a smooth surface or form another microscopic structure layer having protrusions and depressions (not shown). Furthermore, the diffuser sheet 124 can also be formed integrally with the surface 111 of the transparent substrate 111.

Although the transparent substrate 111 and the microscopic structure layer 112 can be bonded together after having been prepared separately, it is preferred that both the transparent substrate 111 and the microscopic structure layer 112 be formed integrally on a single sheet.

In addition, a reflecting polarizer substrate can be provided below the transparent substrate 111 and/or above the microscopic structure layer 112.

In this embodiment of the invention, as shown in FIG. 6, at least a portion of the microscopic structures 113 and 115 of the microscopic structure layer 112 has parallel and non-parallel arrangements repeated one or more times in the longitudinal direction thereof when viewed from above. At least a portion of the microscopic structures of the microscopic structure layer 112 has an array of parallel microscopic structures 113a and 115a and non-parallel microscopic structures 113b and 115b extending in the longitudinal direction thereof. Specifically, the parallel microscopic structures 113a and 115a and the non-parallel microscopic structures 113b and 115b are repeatedly arranged and connected to each other on the plane of the transparent substrate 111. So, the microscopic structure layer 112 has parallel and non-parallel portions repeated in the longitudinal direction of the microscopic structures 113 and 115. In FIG. 6, dark portions correspond to valley portions of the microscopic structures 113 and 115, the luminance of which is relatively lower than that of the peak portions. Although the repetition of the parallel and non-parallel portions is not particularly specified, the parallel and non-parallel portions can be repeated in a predetermined period. The optical sheet 110 having this microscopic structure array is matched with the liquid crystal panel 130 to maintain high luminance without creating moiré fringes, and is advantageous in terms of the manufacturing of an LCD.

FIG. 7 shows the optical sheet 110 according to an exemplary embodiment of the invention matched with the liquid crystal panel 130, viewed from the pixels 131 of the liquid crystal panel 130. As shown in FIG. 7, when viewed from above the liquid crystal panel 130, at least a portion of the microscopic structures of the microscopic structure layer 122 has a microscopic structure array that includes parallel and non-parallel arrangements repeated one or more times in the longitudinal direction thereof. The parallel arrangement is parallel to one side-edge of the pixels of the liquid crystal panel, whereas the non-parallel arrangement is not parallel to one side-edge of the pixels of the liquid crystal panel. That is, in this embodiment of the invention, when the optical sheet 110 is disposed on the liquid panel 130, at least a portion of the microscopic structures 113 and 115 of the microscopic structure layer 112 has parallel and non-parallel intersections repeated one or more times with respect to one side-edge of the pixels 131 including respective sub-pixels 131R, 131G, and 131B. In this fashion, one surface of the optical sheet 110 is tilted. Here, one portion of the microscopic structure array is identical with the liquid crystal panel 130 and the other portion of the microscopic structure array provides the same effect of tilting the optical sheet 110 about the liquid crystal panel 130. Accordingly, this configuration can reduce the moiré fringes while compensating for degradation in luminance.

Figure 3:
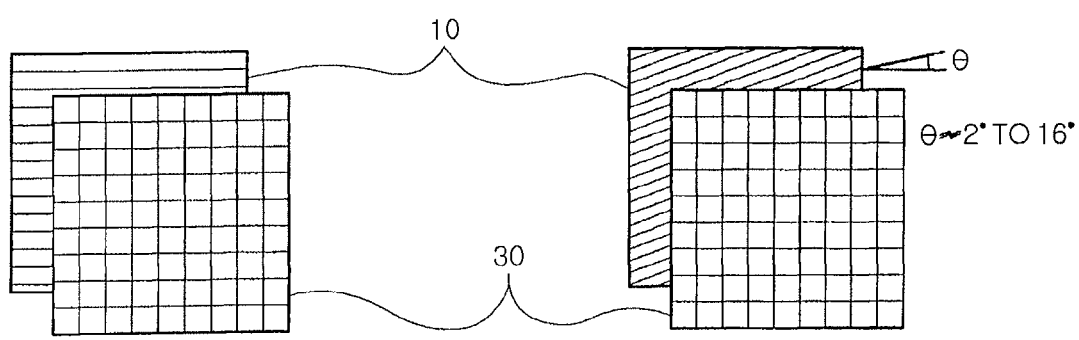
FIG. 3 is a view showing the relationship between the liquid crystal panel and the optical sheet in the LCD of the related art.

In addition, since it is not required to blank the optical sheet in a large angle, as shown in FIG. 3, in order to reduce the moiré fringes, the productivity of LCDs can be improved. Furthermore, in a backlight unit using LEDs as a light source, it is possible to improve the display quality by minimizing white spots and white lines in the form of oblique lines, which occur in the tilting arrangement of the optical sheet, and bright lines, which occur following the tilting of the optical sheet. In addition, according to an exemplary embodiment of the invention, since the non-parallel arrangement is applied to a portion of the microscopic structures, there are effects that reduce the moiré fringes and cover the defects of LCDs. Therefore, it is possible to improve the scratch resistance of the optical sheet and the outer appearance of the backlight unit.

In the optical sheet according to the invention, the cross-sectional shape of the microscopic structures of the microscopic structure layer is not specifically limited. For example, a plurality of shapes, such as a triangular or polygonal prism, a hemisphere, or a partial arc, is possible according to optical characteristics. In addition, although the arrangement of the microscopic structures formed on the transparent substrate is not specifically limited, it is preferred that its pitch interval be from 5 μm to 100 μm. However, it is important for the optical sheet of the invention to have the above-described microscopic structures regardless of the cross-sectional shape or pitch interval that the array of the microscopic structures has.

Although the present invention is not required to specifically limit the period of the parallel and non-parallel arrangements when disposing the liquid crystal panel above the optical sheet, it is preferred that the period be 50 times or less of that of the pixels of the liquid crystal panel.

In addition, although it is preferred that the section converting from the parallel arrangement to the non-parallel arrangement be linear, this section can be curved. In this case, the curvature of the curved section is not specifically limited, but it is preferred that the curvature be 600 times or less of that of the pitch.

In addition, it is preferred that the period of the section converting from the parallel arrangement to the non-parallel arrangement be determined such that the difference in the brightness of light between respective pixels of the liquid crystal panel is 20% or less.

Furthermore, it is preferred that the transmitting area of the liquid crystal panel include a vertically-transmitting area and a horizontally-transmitting area, one of the vertical and horizontally-transmitting areas having a value of 500 μm or less.

While the present invention has been shown and described with reference to certain exemplary embodiments thereof, it will be understood by those skilled in the art that various changes in form and details may be made therein without departing from the spirit and scope of the present invention as defined by the appended claims and their equivalents. For example, although the optical sheet 110 and the diffuser sheet 124 have been discriminated from each other in the exemplary embodiments of the invention, it is possible to form the diffuser sheet 124 integrally with the optical sheet 110 by disposing the diffuser sheet on the underside of the optical sheet.

The invention claimed is:

1. A liquid crystal display comprising:
    a sheet-like transparent substrate made of a transparent material;
    a microscopic structure layer formed on a surface of the transparent substrate, the microscopic structure layer having an array of microscopic structures to emit light; and
    a liquid crystal panel formed above the microscopic structure layer, the liquid crystal panel having defined therein a plurality of pixels to display an image,
    wherein at least a portion of the microscopic structures has parallel and non-parallel arrangements repeated one or more times in a longitudinal direction thereof with respect to one side-edge of the pixels of the liquid crystal panel, and
    wherein the parallel and non-parallel arrangements are repeated in a period that is 50 times or less of that of the pixels of the liquid crystal panel.

2. A liquid crystal display comprising:
    a sheet-like transparent substrate made of a transparent material;
    a microscopic structure layer formed on a surface of the transparent substrate, the microscopic structure layer having an array of microscopic structures to emit light; and
    a liquid crystal panel formed above the microscopic structure layer, the liquid crystal panel having defined therein a plurality of pixels to display an image,
    wherein at least a portion of the microscopic structures has parallel and non-parallel arrangements repeated one or more times in a longitudinal direction thereof with respect to one side-edge of the pixels of the liquid crystal panel, and
    wherein the at least a portion of the microscopic structures has a section converting from the parallel arrangement to the non-parallel arrangement, the converting section having a curvature 600 times or less of a pitch of the microscopic structures.

3. The liquid crystal display according to claim 1, wherein the microscopic structure layer is formed integrally with the transparent substrate.

4. The liquid crystal display according to claim 1, wherein, the parallel and non-parallel arrangements of the at least a portion of the microscopic structures are repeated in a period such that a difference in the brightness of light between respective pixels of the liquid crystal panel is 20% or less.

5. A liquid crystal display comprising:
- a sheet-like transparent substrate made of a transparent material;
- a microscopic structure layer formed on a surface of the transparent substrate, the microscopic structure layer having an array of microscopic structures to emit light; and
- a liquid crystal panel formed above the microscopic structure layer, liquid crystal panel having defined therein a plurality of pixels to display an image,
- wherein at least a portion of the microscopic structures has parallel and non-parallel arrangements repeated one or more times in a longitudinal direction thereof with respect to one side-edge of the pixels of the liquid crystal panel, and
- wherein the liquid crystal panel has a vertically-transmitting area and a horizontally-transmitting area, one of the vertical-transmitting and horizontally-transmitting areas having a value of 500 µm or less.

6. The liquid crystal display according to claim 1, wherein the transparent material is a transparent resin selected from the group consisting of acrylate, polycarbonate, polyester, and polyvinyl chloride.

7. The liquid crystal display according to claim 1, wherein the microscopic structures have a cross-sectional shape selected from the group consisting of a triangle, a polygon, a hemisphere, and a partial arc.

8. The liquid crystal display according to claim 1, wherein a surface of the transparent substrate opposite the microscopic structure layer is a smooth surface.

9. The liquid crystal display according to claim 1, wherein a surface of the transparent substrate opposite the microscopic structure layer is a concave-convex surface.

10. The liquid crystal display according to claim 1, wherein the array of microscopic structures has a pitch interval ranging from 5 µm to 100 µm.

11. The liquid crystal display according to claim 1, further comprising a reflecting polarizer substrate provided below the transparent substrate and/or above the microscopic structure layer.

12. An optical sheet comprising:
- a sheet-like transparent substrate made of a transparent material; and
- a microscopic structure layer formed on a surface of the transparent substrate, the microscopic structure layer having an array of microscopic structures to emit light,
- wherein, when seen from above the transparent substrate, at least a portion of the microscopic structures has parallel and non-parallel arrangements repeated in a longitudinal direction thereof with respect to one side-edge of the transparent substrate, and
- wherein the at least a portion of the microscopic structures has a section converting from the parallel arrangement to the non-parallel arrangement, the converting section having a curvature 600 times or less of a pitch of the microscopic structures.

13. The optical sheet according to claim 12, wherein the parallel and non-parallel arrangements are repeated one or more times.

14. The optical sheet according to claim 12, wherein the at least a portion of the microscopic structures has a section converting from the parallel arrangement to the non-parallel arrangement, the converting section being linear.

15. The optical sheet according to claim 12, wherein the microscopic structure layer is formed integrally with the transparent substrate.

16. The optical sheet according to claim 12, wherein a surface of the transparent substrate opposite the microscopic structure layer is a concave-convex surface.

17. The optical sheet according to claim 12, further comprising a reflecting polarizer substrate provided below the transparent substrate and/or above the microscopic structure layer.

* * * * *